(12) United States Patent
Zhao et al.

(10) Patent No.: US 12,554,302 B2
(45) Date of Patent: Feb. 17, 2026

(54) MULTI-STAGE ARRAY BASED VERTICALLY INTEGRATED POWER DELIVERY

(71) Applicant: Tesla, Inc., Austin, TX (US)

(72) Inventors: Jin Zhao, San Jose, CA (US); Shishuang Sun, Cupertino, CA (US); Yang Sun, Palo Alto, CA (US); Vijaykumar Krithivasan, Mountain View, CA (US); William Chang, Palo Alto, CA (US); Jianjun Li, Irvine, CA (US)

(73) Assignee: Tesla, Inc., Austin, TX (US)

( * ) Notice: Subject to any disclaimer, the term of this patent is extended or adjusted under 35 U.S.C. 154(b) by 47 days.

(21) Appl. No.: 18/683,342

(22) PCT Filed: Aug. 15, 2022

(86) PCT No.: PCT/US2022/040353
§ 371 (c)(1),
(2) Date: Feb. 13, 2024

(87) PCT Pub. No.: WO2023/022991
PCT Pub. Date: Feb. 23, 2023

(65) Prior Publication Data
US 2024/0370070 A1 Nov. 7, 2024

Related U.S. Application Data

(60) Provisional application No. 63/260,392, filed on Aug. 18, 2021.

(51) Int. Cl.
*G06F 1/26* (2006.01)
(52) U.S. Cl.
CPC ..................................... *G06F 1/26* (2013.01)

(58) Field of Classification Search
CPC ........................................................ G06F 1/26
(Continued)

(56) References Cited

U.S. PATENT DOCUMENTS 9,214,415 B2 * 12/2015 Denison ................ H01L 25/072
10,141,745 B2 * 11/2018 Garrity ................. H02M 5/458
(Continued)

FOREIGN PATENT DOCUMENTS

WO   WO 2002/037248 A2   5/2002

OTHER PUBLICATIONS

"A Multi-Level Ladder Converter Supporting Vertically Stacked Digital Voltage Domains"; by Kapil Kesarwani, Christopher Schaef, Charles R. Sullivan, and Jason T. Stauth; from "2013 Twenty-Eighth Annual IEEE Applied Power Electronics Conference and Exposition (APEC)", Published on May 27, 2013; 6 pages (Year: 2013).*
(Continued)

*Primary Examiner* — Brian T Misiura
(74) *Attorney, Agent, or Firm* — Knobbe, Martens, Olson & Bear, LLP (57) ABSTRACT

Aspects of this disclosure relate to power delivery to chips in an array. An array of power conversion paths can be positioned vertically relative to the chips of the array. A power conversion path can convert a high voltage, low current signal to a low voltage, high current. The power conversion path can include a first power conversion stage and a second power conversion stage. The power conversion path can be implemented in a power supply module, for example.

21 Claims, 8 Drawing Sheets

(58) Field of Classification Search
USPC .......................................................... 713/300
See application file for complete search history.

(56) References Cited

U.S. PATENT DOCUMENTS

| | | | | |
|---|---|---|---|---|
| 10,665,579 | B2* | 5/2020 | Trimberger | ............. H01L 24/17 |
| 10,887,892 | B2 | 1/2021 | Nasr et al. | |
| 10,998,903 | B1* | 5/2021 | Vinciarelli | ........... H03K 17/691 |
| 11,122,678 | B2 | 9/2021 | Krithivasan et al. | |
| 11,894,770 | B2 | 2/2024 | Sun et al. | |
| 11,973,004 | B2 | 4/2024 | Cao et al. | |
| 2012/0228696 | A1* | 9/2012 | Carpenter | ......... H01L 23/49575 |
| | | | | 257/329 |
| 2013/0342019 | A1* | 12/2013 | Wagoner | ............... H02M 7/487 |
| | | | | 307/82 |
| 2017/0331371 | A1* | 11/2017 | Parto | ......................... G05F 1/46 |
| 2018/0076718 | A1* | 3/2018 | Zeng | ................. H02M 3/33507 |
| 2023/0197624 | A1* | 6/2023 | Nour | ....................... H01L 25/16 |
| | | | | 257/668 |
| 2023/0297150 | A1* | 9/2023 | Wang | ........................ G06F 1/28 |
| | | | | 700/297 |
| 2024/0015887 | A1 | 1/2024 | Zhao et al. | |
| 2024/0061482 | A1 | 2/2024 | Krithivasan et al. | |
| 2024/0353905 | A1* | 10/2024 | Zhao | ........................ G06F 1/26 |

OTHER PUBLICATIONS

"A Balanced and Vertically Stacked Multilevel Power Converter Topology with Linear Component Scaling" by Matthew Jahnes; Bernard Steyaert; and Matthias Preindl; Dated Oct. 13-16, 2021, 6 Pages (Year: 2021).*

International Search Report and Written Opinion mailed Dec. 8, 2022 in International Application No. PCT/US2022/040353.

* cited by examiner

MULTI-STAGE ARRAY BASED VERTICALLY INTEGRATED POWER DELIVERY

CROSS-REFERENCE TO RELATED APPLICATION

This application is a U.S. national phase application under 35 U.S.C. § 371 of International Application No. PCT/US2022/040353, titled "MULTI-STAGE ARRAY BASED VERTICALLY INTEGRATED POWER DELIVERY," and filed Aug. 15, 2022, which claims the benefit of U.S. Provisional Patent Application No. 63/260,392, titled "HIGH DENSITY MULTI-STAGE ARRAY BASED VERTICAL INTEGRATED POWER SOLUTION FOR DISTRIBUTED COMPUTING APPLICATION," filed Aug. 18, 2021, the disclosures of each of which are incorporated herein by reference in their entireties and for all purposes.

BACKGROUND

Technical Field

The present disclosure relates generally to electronic assemblies with power delivery.

Description of Related Technology

Computing systems can include a plurality of chips and associated electronics, such as power supply modules. High computing density can be desirable. To achieve high computing density, there can be limited area for the associated electronics. The efficiency of power delivery can impact system performance.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a computing system that includes an array of chips comprising a plurality of chips and an array of power conversion paths comprising a plurality of power conversion paths positioned vertically relative to the plurality of chips. The plurality of power conversion paths includes a first power conversion path. The first power conversion path includes a first power conversion stage and a second power conversion stage configured to receive a power supply signal from the first power conversion stage, generate an output power supply signal having a lower voltage and a higher current than the power supply signal, and provide the output power supply signal to a first chip of the plurality of chips.

The first power conversion stage can be vertically integrated with the second power conversion stage. The first power conversion stage can include first circuitry on one or more first printed circuit boards, the second power conversion stage can include second circuitry on one or more second printed circuit boards, and the one or more first printed circuit boards can include stacked with the one or more second printed circuit boards. The second power conversion stage can include circuitry on at least two printed circuit boards. The first power conversion stage can include a first direct-current to direct-current converter, and the second power conversion stage can include a second direct-current to direct-current converter.

A plurality of power supply modules can include the plurality of power conversion paths, in which a first power supply module includes the first power conversion path. The first power supply module can include a thermal transfer structure positioned between the first power conversion stage and the second power conversion stage. The first power supply module can include decoupling capacitors positioned vertically relative to the first and second power conversion stages. The first power supply module can include a clock circuit and filters on a printed circuit board positioned vertically relative to the first and second power conversion stages. Each of the power supply modules can have an area corresponding to a footprint of a respective one of the plurality of chips.

The first power conversion stage can receive an input power supply signal having a voltage in a range from 40 Volts to 60 Volts, and the output power supply signal has a voltage of less than 1 Volt. The output power supply signal can have a voltage of less than 1 Volt and a current on an order of a hundred Amperes.

A system on a wafer can include the array of chips. The computing system can include a wafer level packaging structure.

Another aspect of this disclosure is a method of power supply generation in a computing system. The method includes converting, with a first power conversion stage of a power supply module of an array of power supply modules, an input power supply signal to an intermediate power supply signal. The intermediate power supply signal has a lower current and a higher voltage than the input power supply signal. The method includes generating, with a second power conversion stage of the power supply module, an output power supply signal based on the intermediate power supply signal. The output power supply signal has a lower current and a higher voltage than the intermediate power supply signal. The method includes providing the output power supply signal to a chip of an array of chips by way of at least an electrical interconnect that extends vertically between the power supply module and the chip. The power supply module is positioned vertically relative to the chip.

The first power conversion stage can be vertically integrated with the second power conversion stage. The second power conversion stage can include first circuitry on a first printed circuit board and second circuitry on a second printed circuit board, in which the second printed circuit board is stacked with the first printed circuit board, and in which electrical connections extend vertically between the first printed circuit board and the second printed circuit board. Each power supply module of the array of power supply modules can have an area corresponding to a footprint of a respective chip of the array of chips.

The method can include dissipating heat using a thermal transfer structure position positioned between the first power conversion stage and the second power conversion stage.

The input power supply signal can have a voltage in a range from 40 Volts to 60 Volts, and the output power supply signal can have a voltage of less than 1 Volt.

The method can include performing neural network training using the array of chips. A system on a wafer can include the array of chips.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION OF CERTAIN EMBODIMENTS

The following description of certain embodiments presents various descriptions of specific embodiments. However, the innovations described herein may be embodied in a multitude of different ways, for example, as defined and covered by the claims. In this description, reference is made to the drawings where like reference numerals may indicate identical or functionally similar elements. It will be understood that elements illustrated in the figures are not necessarily drawn to scale. Moreover, it will be understood that certain embodiments may include more elements than illustrated in a drawing and/or a subset of the elements illustrated in a drawing. Further, some embodiments may incorporate any suitable combination of features from two or more drawings.

Aspects of this disclosure relate to an integrated vertical power conversion path, from high voltage, low current to low voltage, high current through multiple stages. The output power supply can have a high current of, for example, a couple of hundred Amperes. At the same time, the output power supply can have a voltage of less than 1 Volt. Each stage realization of the multiple power conversion stages can be independent to the other stage(s). For example, the first stage can be an LLC power conversion stage and the second stage is a buck switching regulator. The vertical power conversion path can be implemented in multiple layered structures, such as stacked printed circuit boards (PCBs). The stacked PCBs can be generally parallel to each other. The PCBs can be interconnected vertically through any suitable electrical connections, such as by soldering or pogo pin connections. Decoupling capacitors can also be integrated into this layered structure. Other functions for supporting a system on chip (SOC), such as clock generation, phase-locked loop (PLL) filters, testing debug circuitry, the like, or any suitable combination thereof can be implemented on one or more of the multiple layered PCBs.

The vertical power solution can be integrated as one vertical structure and contain multiple layered PCBs. Each PCB can include some or all circuitry of a power conversion stage. In certain applications, several PCBs can be combined to serve as one power conversion stage. For example, a buck switching regulator stage can be implemented with 2 stacked PCBs. In the example buck switching regulator, an upper or first PCB can include function blocks such as the input filter circuitry, switching transistors (e.g., switching field effect transistors such as metal oxide semiconductor field effect transistors (MOSFETs), and a controller thereon. This PCB can be integrated as a module. Alternatively, the functional blocks can be implemented in an array format to provide multiple phase power conversion. The lower or second PCB can include an output filter, which can include output inductors and output capacitors. The output inductors and/or capacitors can be arranged in an array format. The 2 PCBs can then be assembled together as one submodule. This submodule is considered as one power conversion stage and integrated with one or more other power conversion stage, for example, through vertical board to board connections (e.g., pogo pins) for vertical power delivery. The PCBs can be interconnected through soldering or pogo pin connection vertically. Decoupling capacitors can also be integrated into this layered structure.

Vertical power solutions can also be implemented differently. Each stacked PCB can include an array of the power conversion stages thereon. For example, each PCB can have one stage of the power conversion thereon in an array format. Such PCBs can then be stacked together to provide array-based power conversion to support a distributed computing application. Since it is layered structure, mechanical and thermal transfer structure can be sandwiched between stacked PCBs so to form a system level power solution.

Other functions for the SOCs, such as clocks, PLL filters, and testing debug signals can be implemented on one or more of the multiple layered PCBs.

Figure 1:
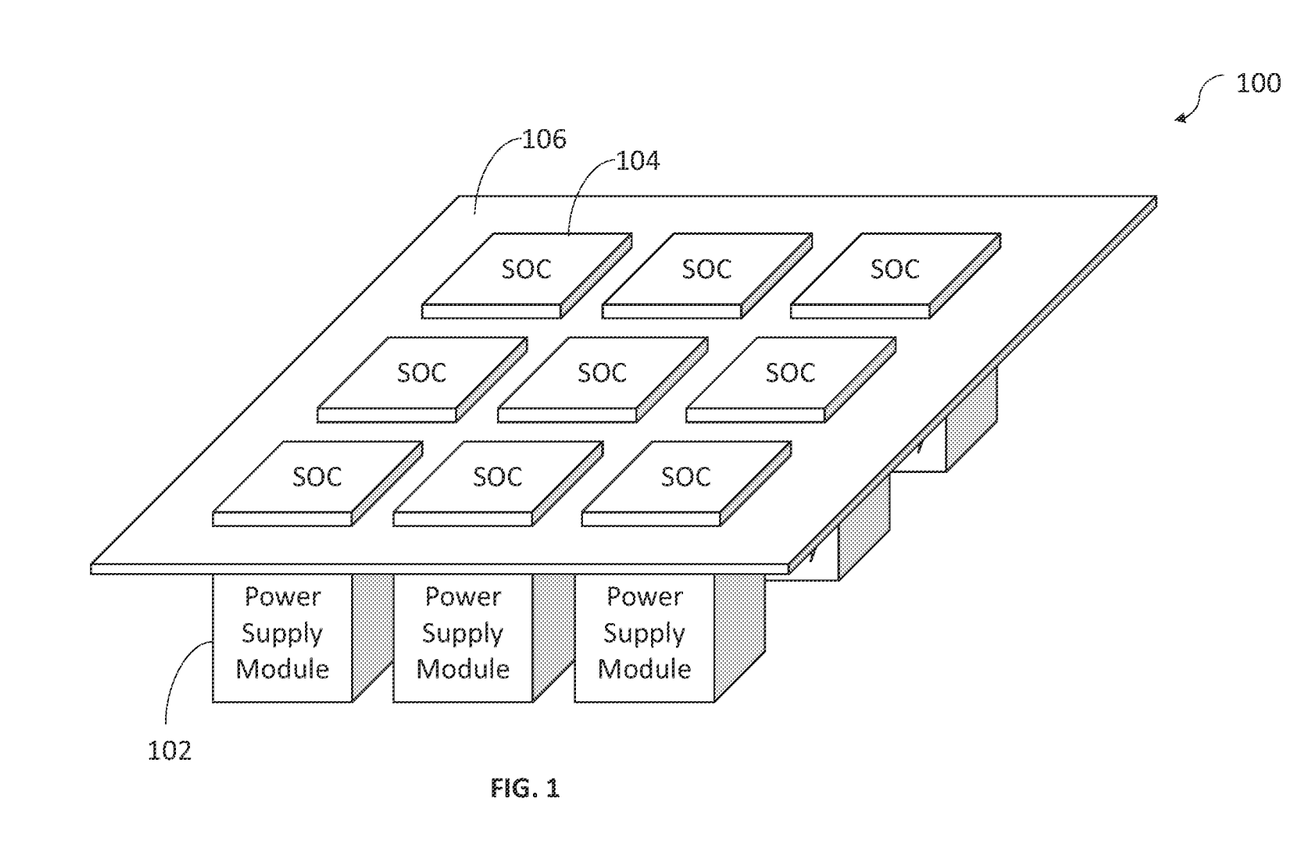
FIG. 1 is a schematic diagram of a system on a wafer assembly that includes an array of chips and an array of power supply modules arranged to provide power supply signals vertically to the chips.

A power conversion path having multiple power conversion stages can be implemented in a power supply module in accordance with any suitable principles and advantages disclosed herein. Power supply modules disclosed herein can be implemented in system on a wafer (SOW) assemblies. FIG. 1 is a schematic diagram of a SOW assembly 100 that includes an array of power supply modules 102 and an array of chips 104 arranged to receive power supply signals vertically from the power supply module 102. A SOW can include the array of chips 104 and the substrate 106. The substrate 106 can include a plurality of routing layers. A SOW assembly includes one or more wafer level packaging structures around the SOW. The SOW assembly 100 can be included in a processing system with a high compute density. Such a processing system can be used in and/or specifically configured for high performance computing and/or computation intensive applications, such as neural network training and/or processing, machine learning, artificial intelligence, or the like. The processing system can generate data for an autopilot system for a vehicle.

As illustrated in FIG. 1, an array of chips 104 are on a substrate 106. The array can include a plurality of chips 104 that are each an instance of a computing chip for a distributed computing application. Each chip 104 of the array can be an integrated circuit die. Each chip 104 of the array can be an SOC. The chips 104 can interface with each other (e.g., through one or more input/output blocks of a chip 104) to implement distributed computing functionality. For example, each chip 104 can be electrically connected with each neighboring each chip 104 that is directly adjacent in a row or column of the array. The chips 104 can be located in close proximity to each other to facilitate short routes between chips and to implement high compute density. Each chip 104 can execute computing operations that include one or more of computation, storage, and communication external to the chip.

The array of power supply modules 102 includes a plurality of power supply modules 102 arranged to vertically deliver power to a respective chip 104. Each power supply module 102 can implement a power conversion path with a plurality of power conversion stages. Vertical power delivery can improve performance relative to lateral power delivery by reducing direct current losses. There can be less resistive losses with a shorter path between a power supply module 102 and a chip 104 that are positioned vertically relative to each other. To achieve a high compute density and vertical power delivery, a power supply module 102 can have the same or a similar footprint as a chip 104. With such a design, the array of power supply modules 102 should not cause any additional spacing between chips 104. As shown in FIG. 1, each power supply module 102 can be aligned with and positioned vertically relative to a respective chip 104.

Each power supply module 102 can be a packaged component that includes a power conversion path, where the power conversion path includes multiple power conversion stages. Alternatively, power conversion paths for a plurality of chips 104 can be implemented as arrays of power conversion circuitry on a plurality of stacked PCBs.

Figure 2:
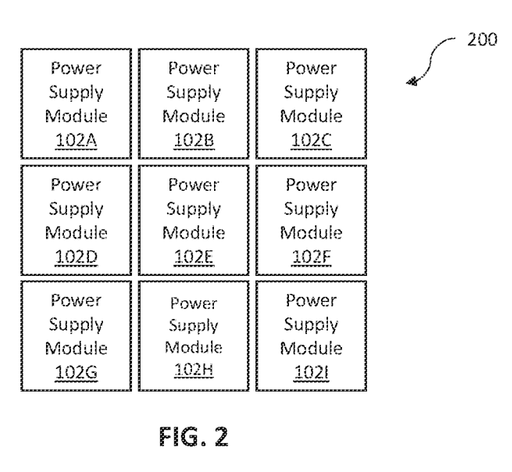
FIG. 2 is a schematic diagram of an array of power supply modules.

Embodiments of this disclosure can provide a solution to technical problems associated with providing power vertically to chips arranged in an array. FIG. 2 illustrates an array 200 of power supply modules 102A, 102B, 102C, 102D, 102E, 102F, 102G, 102H, and 102I. These power supply modules 102A to 102I can provide power supply signals vertically to chips via electrical connections extending vertically between the power supply modules 102A to 102I and respective chips. The power supply modules 102A to 102I can be located under or above respective chips. The vertically provided power supply signals are provided orthogonally relative to a major surface of the chip.

Figure 3:
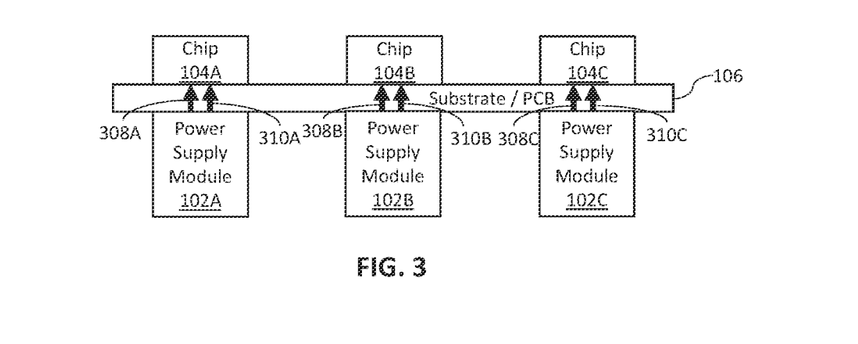
FIG. 3 is a schematic diagram of an array of power supply modules arranged to provide power vertically to an array of chips according to an embodiment.

FIG. 3 is a schematic diagram of an array of power supply modules 102A to 102C arranged to provide power vertically to an array of chips 104A to 104C according to an embodiment. As shown in FIG. 3, chips 104A, 104B, and 104C are positioned on a substrate or printed circuit board 106. On the opposite side of the substrate or printed circuit board 106, there are power supply modules 102A, 102B, and 102C associated with each of the chips. The power supply modules 102A to 102C can include a plurality of power conversion stages in accordance with any suitable principles and advantages disclosed herein. The power supply modules 102A, 102B, and 102C can be power supply modules of the array 200 of FIG. 2, for example.

The power supply modules 102A to 102C can vertically deliver power supply signals to the chips 104A to 104C. For example, as shown in FIG. 3, power signals can be carried vertically from the power supply modules 102A to 102C to the chips 104A to 104C by way of vertical electrical connections 308A, 308B, 308C, 310A, 310B, and 310C. These electrical connections extend vertically from the power supply modules 102A to 102C to the chips 104A to 104C. The electrical connections can be implemented by pogo pins and/or other suitable vertical connectors.

In some embodiments, the chips 104A to 104C may be disposed on a printed circuit board (for example, singulated from a wafer and then mounted to a circuit board). In certain embodiments, the chips 104A to 104C may be part of a SOW assembly. The SOW assembly can include wafer level packaging. In some such embodiments, a system on a wafer that includes the chips 104 can be an integrated fan-out (InFO) wafer.

In addition to simplifying design by reducing the complex routing to route signals within the plane, vertical power delivery can achieve one or more other advantages. By vertically delivering power, the power losses that typically occur as signals travel laterally on a PCB may be significantly reduced due to shorter delivery paths and corresponding reduced resistance of the delivery paths. Such a reduction may not only reduce the direct current (DC) IR loss (e.g., the decrease in available voltage at the load device, such as a chip), but may also reduce the parasitic loop inductance associated with a current loop, thereby reducing the capacitance for circuit decoupling. Such vertically arranged block arrays may enable high computing density and high-speed communication among the die of the array, which can be advantageous for AI machine learning applications and other applications where large compute power and high-speed communication are significant advantages.

Example power supply modules 102 are voltage regulating modules. A VRM can covert a direct current voltage to a lower voltage at a higher current to provide a power supply voltage for a chip. VRMs can receive a high voltage, low current input signal and generate a high current, low voltage output signal. VRMs can include a plurality of power conversion stages in accordance with any suitable principles and advantages disclosed herein. The high current, low voltage output can have a current on the order of 100s of Amperes and a voltage of under 1 Volt in certain applications.

Figure 4:
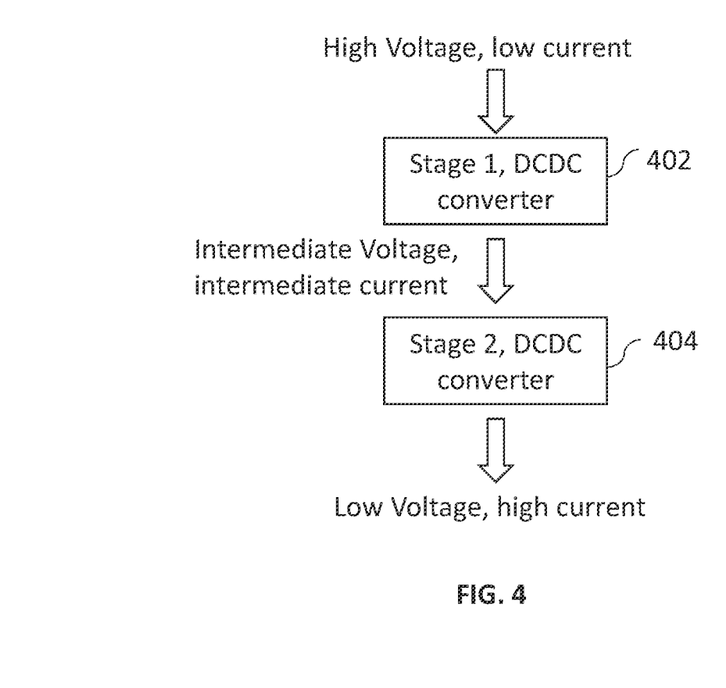
FIG. 4 is a schematic block diagram of power conversion stages of a power supply module according to an embodiment.

FIG. 4 is a schematic block diagram of power conversion stages of a power supply module according to an embodiment. A power supply module can include a first power conversion stage 402 and a second power conversion stage 404. These stages can be implemented independent of each other. A multi-stage power conversion can be more efficient than a single stage power conversion in certain applications. A multi-stage power conversion can be implemented in a relatively small footprint in various applications.

The first power conversion stage 402 can receive an input power supply signal having a high voltage and a low current. The input power supply signal can have a voltage in a range from 40 Volts to 60 Volts, for example. The first power conversion stage 402 can convert the input power supply signal into an intermediate power supply signal having a lower voltage and a higher current than the input power supply signal. The first power conversion stage 402 can be any suitable power conversion stage. For example, the first power conversion stage 402 can include a direct-current to direct-current (DCDC) converter.

The second power conversion stage 404 can receive the intermediate power supply signal and generate an output power supply signal. The output power supply signal can have a lower voltage and a higher current than the intermediate power supply signal. The output power supply signal can have a current on the order of 100 Amperes and a voltage of less than 1 Volt in certain applications. The second power conversion stage 404 can be vertically integrated with the first power conversion stage 402. The first and second power conversion stages 402 and 404 can be implemented within a footprint of a chip that receive power from the power supply module. The second power conversion stage 404 can be any suitable power conversion stage. For example, the second power conversion stage 404 can include a DCDC converter.

Although two power conversion stages are shown in FIG. 2, three or more power conversion stages can be implemented in accordance with any suitable principles and advantages disclosed herein. For example, a power conversion stage can covert a 1000 Volt power supply signal to a 50 Volt power supply signal and provide the 50 Volt power supply signal to an input node of the first power conversion stage 402 of FIG. 4. In FIG. 4, the terms first and second are used as descriptors for power conversion stages and there can be a power conversion stage in a power supply module before the first power conversion stage 402.

Figure 5:
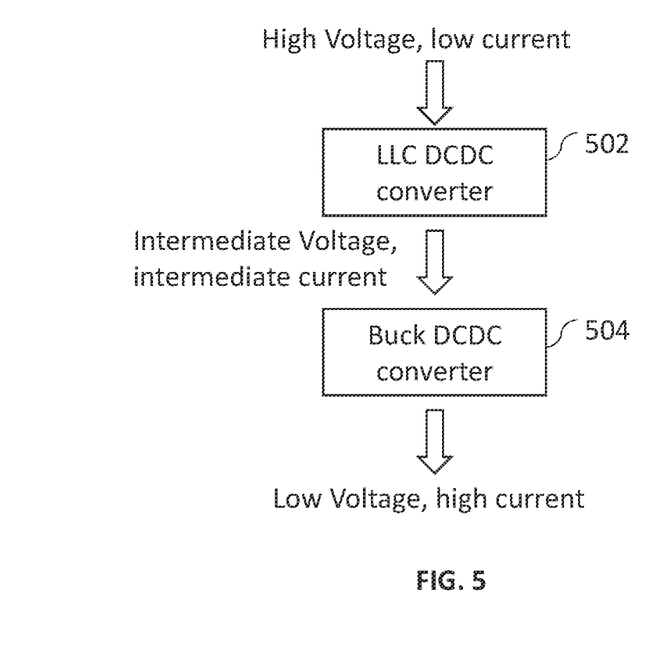
FIG. 5 is a schematic block diagram of power conversion stages of a power supply module according to an embodiment.

FIG. 5 is a schematic block diagram of power conversion stages of a power supply module according to an embodiment. The power conversion stages of FIG. 5 are examples of the power conversion stages of FIG. 4. As shown in FIG. 5, a first power conversion stage 502 can include an LLC converter. The LLC converter can be a DCDC converter. The LLC power converter can include two inductors and a capacitor. The combination of the two inductors and the capacitor can have a resonance at a switching frequency. The LLC resonant converter can also include two bridge circuits and an isolation transformer. A second power conversion stage 504 can include a buck converter. The buck converter can be a DCDC converter. The buck converter is a type of switching converter that can step down a DC voltage with relatively high efficiency.

In certain applications, a power conversion stage can be implemented on two or more stacked PCBs. Accordingly, different parts of the power conversion stage can be vertically integrated with each other. The vertical integration of circuit elements of the power conversion stage can contribute to a power supply module having a footprint corresponding to a footprint of the integrated circuit die that receives a power supply signal from the power supply module. The corresponding footprint of the power supply module can be substantially the same as the footprint of the integrated circuit die, within the footprint of the integrated circuit die, or slightly larger than the footprint of the integrated circuit die. In certain applications, two or more power conversion stages can each be implemented with vertically integrated circuit elements.

Figure 6:
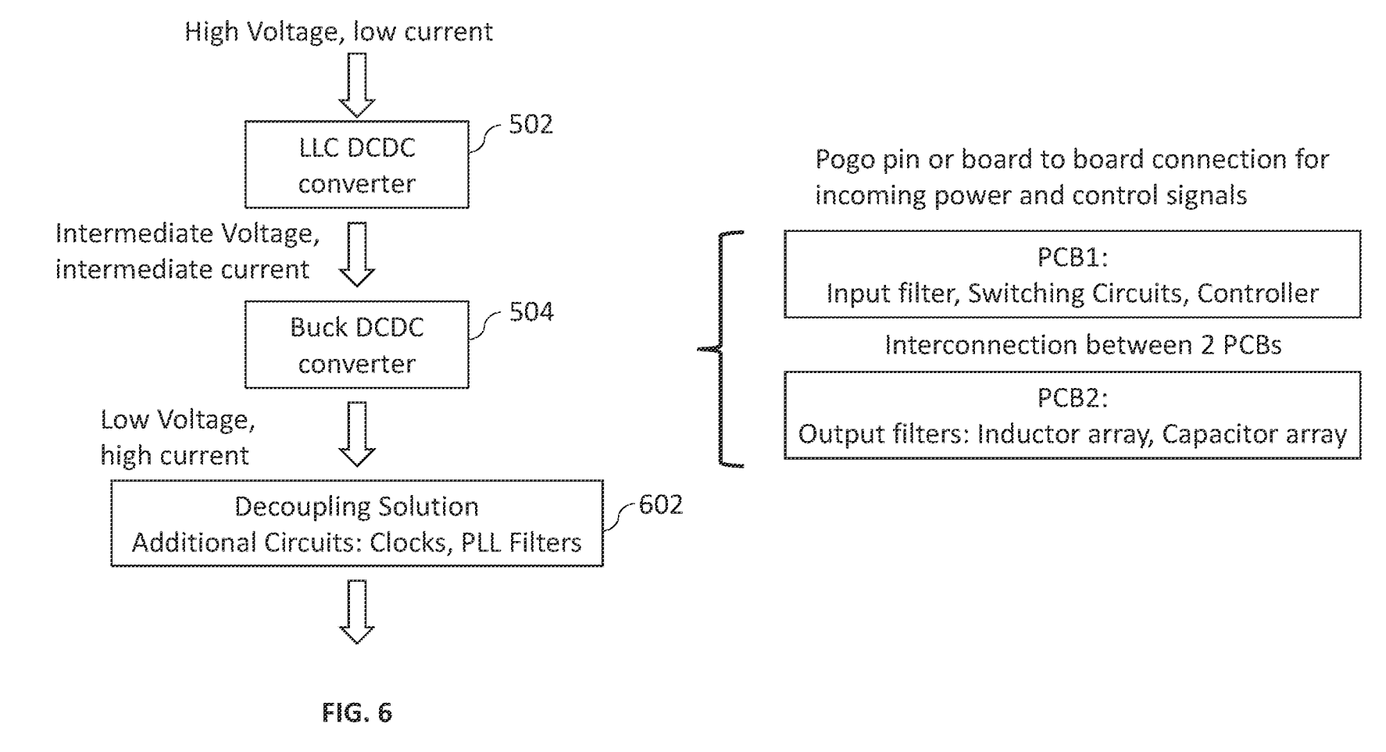
FIG. 6 is a schematic block diagram of power conversion stages and additional functionality of a power supply module according to an embodiment.

FIG. 6 is a schematic block diagram of power conversion stages and additional circuitry of a power supply module according to an embodiment. A power supply module can include the first power conversion stage 502, the second power conversion stage 504, and additional circuitry 602.

The first power conversion stage 502 can be implemented on a single PCB in certain applications. In some other applications, the first power conversion stage 502 can be implemented on two or more PCBs. Whether the first power conversion stage 502 is implemented on one or a plurality of PCBs can depend on the type of power conversion stage and a footprint of the power supply module.

The second power conversion stage 504 can be implemented on a first PCB and a second PCB. The first PCB can include an input filter, switching circuits, and a controller thereon. The second PCB can include an inductor array and a capacitor array thereon. In some instances, a single array can include inductors and capacitors. The first and second PCBs can be electrically connected by any suitable board to board electrical connections. For example, the first PCB and the second PCB can be electrically connected by pogo pins. The board-to-board electrical connections can carry power and/or control signals. The second power conversion stage 504 can be a buck converter that includes circuitry on the first and second PCBs.

The additional circuitry 602 of the power supply module can be included on a PCB stacked with and positioned vertically relative to the second power conversion stage 504. The additional circuitry 602 can include decoupling capacitors. The additional circuitry 602 can include one or more of clock circuitry, PLL filters, debugging circuitry, or the like.

Figure 7:
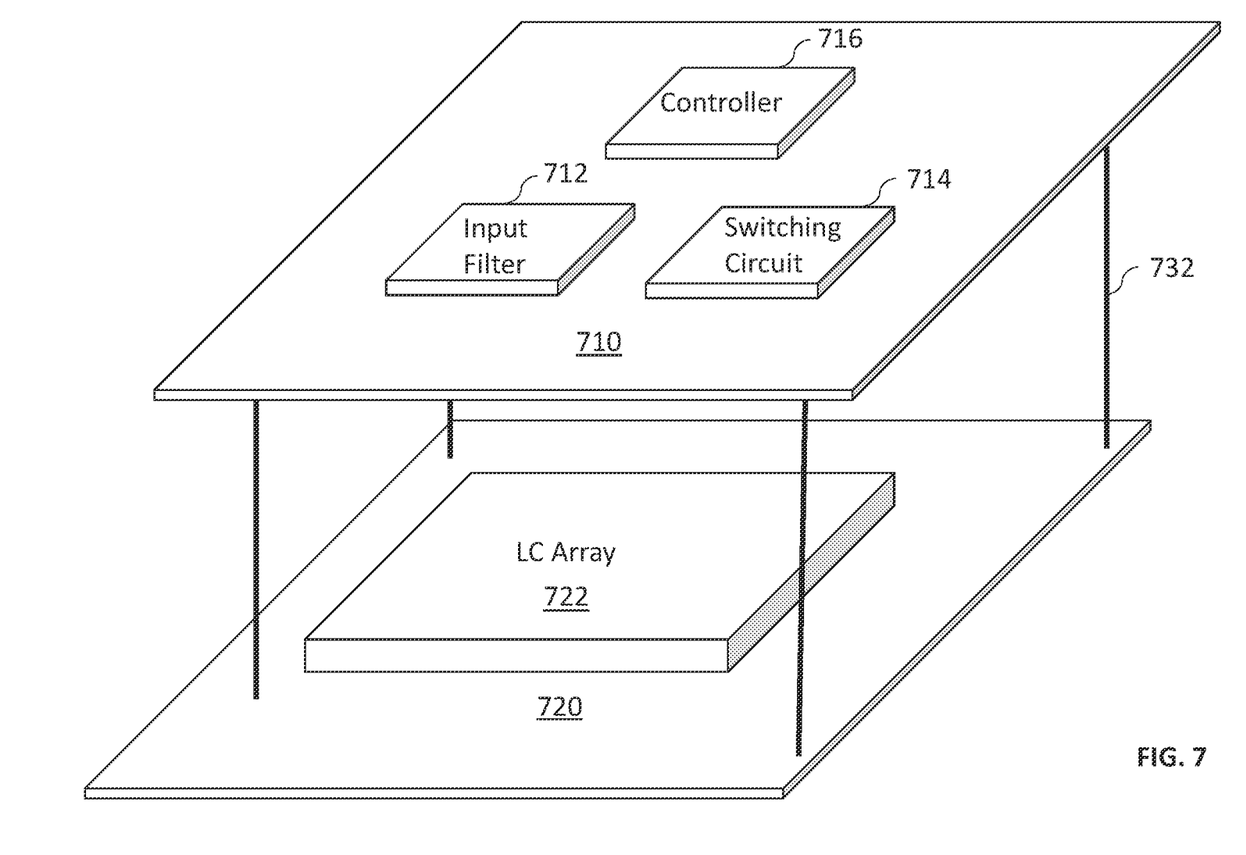
FIG. 7 is a schematic isometric view of power conversion stage implemented on a plurality of printed circuit boards according to an embodiment.

FIG. 7 is a schematic isometric view of an example power conversion stage implemented on a plurality of printed circuit boards according to an embodiment. The power conversion stage can be a buck converter, for example. As illustrated, an input filter 712, a switching circuit 714, and a controller 716 are on a first PCB 710. The first PCB 710 is electrically connected to a second PCB 720 by way of electrical connections 732. An LC array 722 includes inductors and capacitors on the second PCB 720. Alternatively, a capacitor array can be on the second PCB 720 and an inductor array can be positioned vertically relative to the capacitor array. The power conversion stage of FIG. 7 can be implemented in a relatively small footprint such that a power supply module that includes this power conversion stage can have a footprint that corresponds to a footprint of an integrated circuit die arrange to receive a power supply signal from the power supply module. This can enable a high compute density computing system, where the power supply module does not constrain compute density.

Figure 8:
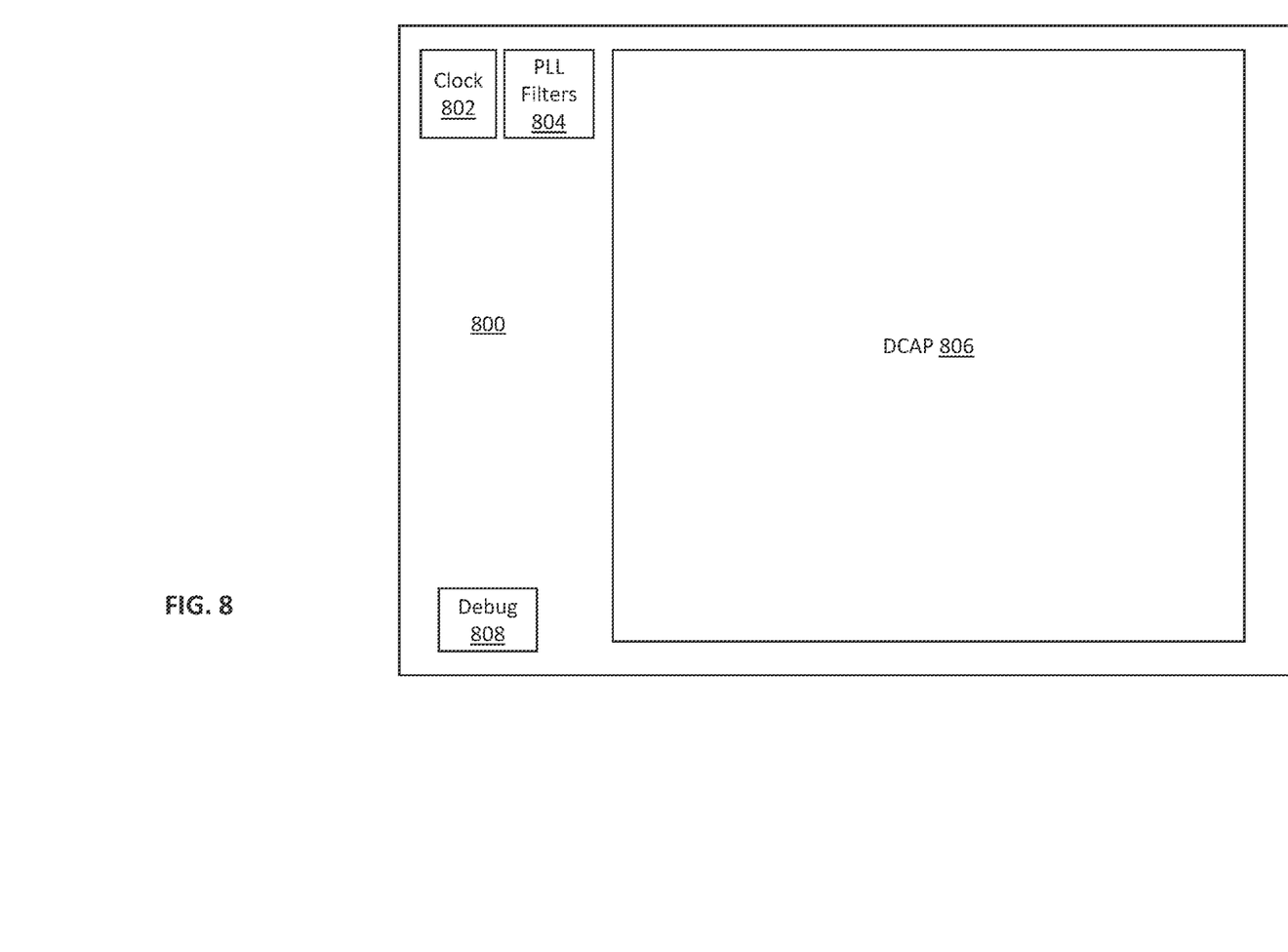
FIG. 8 is a schematic diagram of a printed circuit board of a power supply module that includes additional circuitry according to an embodiment.

FIG. 8 is a schematic diagram block of a PCB 800 of a power supply module that includes additional circuitry according to an embodiment. FIG. 8 illustrates an example of the additional circuitry 602 of FIG. 6 implemented on a PCB 800. The additional circuitry can include clock circuitry 802, PLL filters 804, decoupling capacitors 806, and debugging circuitry 808. The decoupling capacitors 806 can occupy a majority of the area on the PCB 800. The decoupling capacitors 806 can be implemented by one or more arrays of decoupling capacitors. The clock circuitry 802 can be located in proximity to the PLL filters 804. As an example, the clock circuitry 802 and the PLL filters 804 can be located near a corner of the PCB 800. Each of the clock circuitry 802, the PLL filters 804, and the debugging circuitry 808 can occupy a relatively small area compared to the decoupling capacitors 806.

Figure 9:
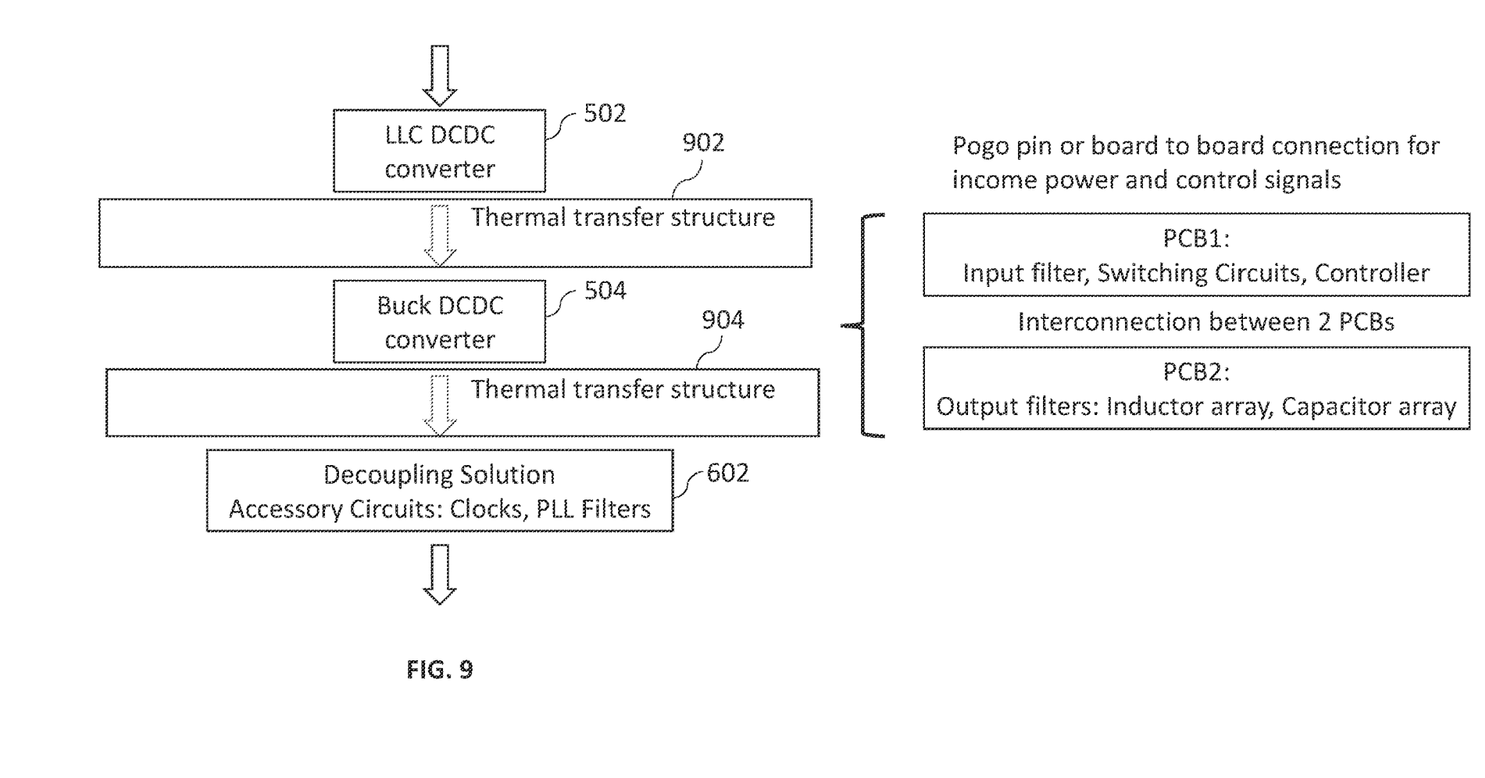
FIG. 9 is a schematic block diagram of power conversion stages and thermal transfer structures of a power supply module according to an embodiment.

FIG. 9 is a schematic block diagram of power conversion stages and thermal transfer structures of a power supply module according to an embodiment. In power supply modules, a thermal transfer structure can be implemented between vertically integrated components. For example, a thermal transfer structure can be implemented between two different power conversion stages. A thermal transfer structure can dissipate heat, remove heat, or otherwise lower a maximum temperature of the power supply module during operation. A thermal transfer structure can include a heat sink, a heat spreader, a cold plate, or the like. A first thermal transfer structure 902 can be positioned between the first power conversion stage 502 and the second power conversion stage 504. A second thermal transfer structure 904 can be positioned between the second power conversion stage 504 and the additional circuitry 602. One or more thermal transfer structures can be included in a power supply module in accordance with any suitable principles and advantages disclosed herein.

Figure 10:
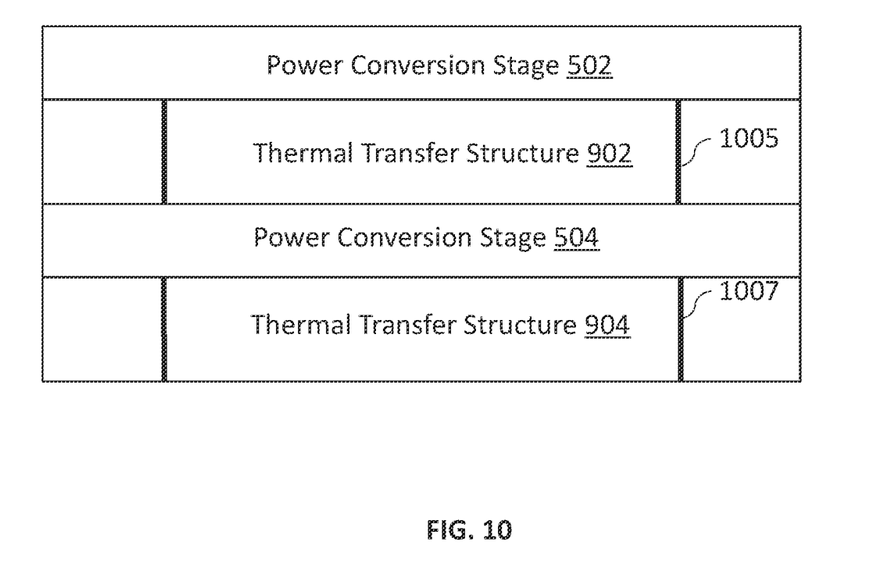
FIG. 10 is a schematic side or cross-sectional diagram of a power supply module with multiple power conversion stages and thermal transfer structures according to an embodiment.

FIG. 10 is a schematic side or cross-sectional block diagram of a power supply module with multiple power conversion stages and thermal transfer structures according to an embodiment. As illustrated, a first thermal transfer structure 902 can be positioned between a first power conversion stage 502 and a second power conversion stage 504. Electrical connections 1005 between the first power conversion stage 502 and a second power conversion stage 504 can extend vertically through the first thermal transfer structure 902. Alternatively or additionally, one or more electrical connections extending vertically between the first power conversion stage 502 and a second power conversion stage 504 can be located around a perimeter of the first thermal transfer structure 902. A second thermal transfer structure 904 can be positioned on a opposite side of the second power conversion stage 504 relative to the first thermal transfer structure 902. Accordingly, the second power conversion stage 504 can be positioned between two thermal transfer structures. In certain applications, the second thermal transfer structure 904 can be positioned between the second power conversion stage 504 and additional circuitry of a power supply module (e.g., additional circuitry 602 of FIG. 6 and/or FIG. 8). Electrical connections 1007 can extend from the second power conversion stage 504 vertically through the second thermal transfer structure 904. The electrical connections 1007 can carry the power supply signal output from the second power conversion stage 504, for example. Alternatively or additionally, one or more electrical connections extending vertically from the second power conversion stage 504 can be located around a perimeter of the second thermal transfer structure 904.

A number and position(s) of thermal transfer structure(s) included in a power supply module can depend on thermal specifications, heat generation by power conversion stages, available space in a power supply module, the like, or any suitable combination thereof. One or more thermal transfer structures can be located in any suitable location(s) of the power supply module. The one or more thermal transfer structure can be positioned vertically relative to the power conversion stages so as to not increase a footprint of the power supply module. In some applications, a power supply module can include a single thermal transfer structure positioned between two power conversion stages. According to some applications, a power delivery module can include two or more thermal transfer structures each positioned between two different power conversion stages. For example, the second thermal transfer structure 904 of FIG. 10 can be positioned between the second power conversion stage 504 and a third power conversion stage. In some applications, a thermal transfer structure can be positioned on a side of a power conversion stage opposite to another power conversion stage. In such applications, there may be no thermal transfer structure positioned between the power conversion stage and the other power conversion stage.

Any suitable principles and advantages disclosed herein can be applicable to wafer level packaging and/or high-density multiple die packaging. Any suitable combination of features of two or more embodiments disclosed herein can be implemented. For example, a system on wafer (SOW) assembly can include any suitable combination of the multi-stage vertical power delivery disclosed herein.

The SOW assemblies disclosed herein can be included in a processing system. Features of this disclosure, such as any of the techniques related to multi-stage power conversion, can be implemented in any suitable processing system. The processing system can have a high compute density and, in certain instance, can dissipate heat generated by the processing system. The processing system can execute trillions of operations per second in certain applications. The processing system can be used in and/or specifically configured for high performance computing and/or computation intensive applications, such as neural network training and/or processing, machine learning, artificial intelligence, or the like. The processing system can implement redundancy. In some applications, the processing system can be used to perform processing to generate data for an autopilot system for vehicle (e.g., an automobile), other autonomous vehicle functionality, or Advanced Driving Assistance System (ADAS) functionality.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

The foregoing description has been described with reference to specific embodiments. However, the illustrative discussions above are not intended to be exhaustive or to limit the inventions to the precise forms described. Many modifications and variations are possible in view of the above teachings. Others skilled in the art are thereby enabled to best utilize the techniques and various embodiments with various modifications as suited to various uses.

Although the disclosure and examples have been described with reference to the accompanying drawings, various changes and modifications will become apparent to those skilled in the art. Such changes and modifications are to be understood as being included within the scope of the disclosure.

What is claimed is:

1. A computing system comprising:
an array of chips comprising a plurality of chips; and
an array of power conversion paths comprising a plurality of power conversion paths positioned vertically relative to the plurality of chips, the plurality of power conversion paths comprising a first power conversion path, the first power conversion path comprising:
a first power conversion stage; and
a second power conversion stage configured to receive a power supply signal from the first power conversion stage, generate an output power supply signal having a lower voltage and a higher current than the power supply signal, and provide the output power supply signal to a first chip of the plurality of chips, wherein the first power conversion stage is positioned vertically relative to the second power conversion stage.

2. The computing system of claim 1, wherein the second power conversion stage comprises:
first circuitry on a first printed circuit board; and
second circuitry on a second printed circuit board, the second printed circuit board being stacked with the first printed circuit board, wherein electrical connections extend vertically between the first printed circuit board and the second printed circuit board.

3. The computing system of claim 1, wherein the first power conversion stage comprises first circuitry on one or more first printed circuit boards, the second power conversion stage comprises second circuitry on one or more second printed circuit boards, and the one or more first printed circuit boards are stacked with the one or more second printed circuit boards.

4. The computing system of claim 1, wherein the first power conversion stage comprises a first direct-current to direct-current converter, and the second power conversion stage comprises a second direct-current to direct-current converter.

5. The computing system of claim 1, wherein a plurality of power supply modules comprises the plurality of power conversion paths, and a first power supply module comprises the first power conversion path.

6. The computing system of claim 5, wherein the first power supply module comprises a thermal transfer structure positioned between the first power conversion stage and the second power conversion stage.

7. The computing system of claim 5, wherein the first power supply module comprises decoupling capacitors positioned vertically relative to the first and second power conversion stages.

8. The computing system of claim 5, wherein each of the power supply modules has an area corresponding to a footprint of a respective one of the plurality of chips.

9. The computing system of claim 1, wherein the first power conversion stage is configured to receive an input power supply signal having a voltage in a range from 40 Volts to 60 Volts, and the output power supply signal has a voltage of less than 1 Volt.

10. The computing system of claim 1, wherein the output power supply signal has a voltage of less than 1 Volt and a current on an order of a hundred Amperes.

11. The computing system of claim 1, wherein a system on a wafer comprises the array of chips, and the computing system comprises a wafer level packaging structure.

12. A computing system comprising:
an array of chips comprising a plurality of chips; and
an array of power conversion paths comprising a plurality of power conversion paths positioned vertically relative to the plurality of chips, the plurality of power conversion paths comprising a first power conversion path, the first power conversion path comprising:
a first power conversion stage; and
a second power conversion stage configured to receive a power supply signal from the first power conversion stage, generate an output power supply signal having a lower voltage and a higher current than the power supply signal, and provide the output power supply signal to a first chip of the plurality of chips, wherein a plurality of power supply modules comprises the plurality of power conversion paths and a first power supply module comprises the first power conversion path, and wherein the first power supply module comprises a clock circuit and filters on a printed circuit board positioned vertically relative to the first and second power conversion stages.

13. The computing system of claim 12, wherein the first power conversion stage is vertically integrated with the second power conversion stage.

14. A method of power supply generation in a computing system, the method comprising:
converting, with a first power conversion stage of a power supply module of an array of power supply modules, an input power supply signal to an intermediate power supply signal, wherein the intermediate power supply signal has a lower current and a higher voltage than the input power supply signal;
generating, with a second power conversion stage of the power supply module, an output power supply signal based on the intermediate power supply signal, wherein the output power supply signal has a lower current and a higher voltage than the intermediate power supply signal; and
providing the output power supply signal to a chip of an array of chips by way of at least an electrical interconnect that extends vertically between the power supply module and the chip, wherein the power supply module is positioned vertically relative to the chip, and wherein the first power conversion stage and the second power conversion stage are each positioned vertically relative to the chip.

15. The method of claim 14, wherein the second power conversion stage comprises:
first circuitry on a first printed circuit board; and
second circuitry on a second printed circuit board, the second printed circuit board being stacked with the first printed circuit board, wherein electrical connections extend vertically between the first printed circuit board and the second printed circuit board.

16. The method of claim 14, wherein each power supply module of the array of power supply modules has an area corresponding to a footprint of a respective chip of the array of chips.

17. The method of claim 14, further comprising dissipating heat using a thermal transfer structure position positioned between the first power conversion stage and the second power conversion stage.

18. The method of claim 14, wherein the input power supply signal has a voltage in a range from 40 Volts to 60 Volts, and the output power supply signal has a voltage of less than 1 Volt.

19. The method of claim 14, wherein a system on a wafter comprises the array of chips.

20. The method of claim 14, further comprising performing neural network training using the array of chips.

21. The method of claim 14, wherein the power supply module comprises a clock circuit and filters on a printed circuit board positioned vertically relative to the first and second power conversion stages.

* * * * *